(12) United States Patent
Tran et al.

(10) Patent No.: US 11,706,488 B2
(45) Date of Patent: Jul. 18, 2023

(54) LOCATING AND IDENTIFYING PAIRED ELECTRONIC DEVICES

(71) Applicant: ARRIS Enterprises LLC, Suwanee, GA (US)

(72) Inventors: Sean Tran, San Diego, CA (US); Arpan Kumar Kaushal, San Diego, CA (US); Nguyen C Tat, Carlsbad, CA (US); Peng Wu, Beijing (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 163 days.

(21) Appl. No.: 17/297,098

(22) PCT Filed: May 29, 2020

(86) PCT No.: PCT/CN2020/093292
§ 371 (c)(1),
(2) Date: May 26, 2021

(87) PCT Pub. No.: WO2021/237686
PCT Pub. Date: Dec. 2, 2021

(65) Prior Publication Data
US 2022/0312074 A1 Sep. 29, 2022

(51) Int. Cl.
*H04N 21/442* (2011.01)
*H04W 76/10* (2018.01)
(Continued)

(52) U.S. Cl.
CPC . *H04N 21/44227* (2013.01); *H04N 21/42204* (2013.01); *H04W 8/005* (2013.01); *H04W 76/10* (2018.02)

(58) Field of Classification Search
CPC combination set(s) only.
See application file for complete search history.

(56) References Cited

U.S. PATENT DOCUMENTS

| 2006/0088290 A1 | 4/2006 | Takagi | |
|---|---|---|---|
| 2019/0132385 A1* | 5/2019 | Burba | H04L 67/104 |
| 2022/0338281 A1* | 10/2022 | Kwon | H04L 12/28 |

FOREIGN PATENT DOCUMENTS

| CN | 104581331 | 4/2015 |
| CN | 107708095 | 2/2018 |
| CN | 110290570 | 9/2019 |

OTHER PUBLICATIONS

International Search Report and the Written Opinion of the International Searching Authority dated Feb. 20, 2021 in International (PCT) Application No. PCT/CN2020/093292.

* cited by examiner

*Primary Examiner* — Samira Monshi
(74) *Attorney, Agent, or Firm* — Wenderoth, Lind & Ponack, L.L.P,

(57) ABSTRACT

An electronic device, method, and a non-transitory computer-readable recording medium provide a function of locating and identifying a paired device in a wireless network. The wireless network communicatively connects a plurality of electronic devices including the electronic device and the paired device. The electronic device includes a user interface, a network interface, a hardware processor, and a non-transitory memory storing one or more programs. The hardware processor executes the programs to receive a search command using a first communication connection via the network interface. Moreover, the hardware processor executes the programs to determine whether the peer device identifying information matches identifying information of the electronic device. When the peer device identifying information matches the identifying information of the electronic device, the electronic device identifies as the paired device. Otherwise, the electronic device broadcasts to the wireless network using a second communication connection.

21 Claims, 6 Drawing Sheets

(51) Int. Cl.
*H04N 21/422* (2011.01)
*H04W 8/00* (2009.01)

LOCATING AND IDENTIFYING PAIRED ELECTRONIC DEVICES

TECHNICAL FIELD

The subject matter of the present disclosure relates generally to locating and identifying paired electronic devices.

BACKGROUND

Many households receive content broadcast by various content media devices such as set-top-boxes (STBs). In fact, it is not uncommon for a single household to have several STBs, each located in different rooms of the household. Each STB is typically operated using a paired remote control device such that each STB and corresponding remote control unit constitute a STB remote control unit pair. The remote control units are typically used for various control functions associated with the STB including the control of the operating function of the STB as well as searching and selecting of content.

Since each STB is paired with a remote control device, it important to keep the remote control units in the vicinity of its paired STB. However, sometimes users lose, misplace, or carry the remote control units to locations that are out of range of the paired STB, which can be frustrating because many users cannot manually operate the STB and depend on the use of a remote control unit. Additionally, it is difficult and inconvenient to locate the remote control unit for a specific STB, especially when a household has several STBs at different locations.

Moreover, it is not always easy to determine which one of several remote control units is paired to which one of several STBs. Typically, a user tests each of the remote controls to determine which one is paired to a given STB but this is also time consuming and inconvenient. Some users may even resort to purchasing a new paired remote control unit for a specific STB, which can be expensive.

Thus, it would be advantageous and an improvement over the relevant technology to provide a device, method, and computer-readable recording medium for locating and identifying lost or misplaced paired electronic devices.

SUMMARY

An aspect of the present disclosure provides an electronic device having a function of locating and identifying a paired device in a wireless network. The wireless network communicatively connects a plurality of electronic devices including the electronic device and the paired device. The electronic device includes a user interface, a network interface configured to establish communication connections via the wireless network, a hardware processor, and a non-transitory memory configured to store one or more programs. The hardware processor is configured to execute the one or more programs to receive a search command using a first communication connection via the network interface. The search command includes identifying information of the paired device as a peer device.

Moreover, the hardware processor is configured to execute the one or more programs to determine whether the identifying information in the search command for the peer device matches identifying information of the electronic device. When the identifying information in the search command for the peer device matches the identifying information of the electronic device, the electronic device identifies as the paired device. When the identifying information in the search command for the peer device does not match the identifying information of the electronic device, the search command is broadcast using a second communication connection via the network interface to the wireless network.

In an aspect of the present disclosure, the electronic device is a first electronic device in the wireless network and includes a set-top-box (STB).

In an aspect of the present disclosure, the network interface is configured to receive the search command from a second electronic device in the wireless network, and the first communication connection is a back channel connection that operates in accordance with Wi-Fi or Ethernet protocols.

In an aspect of the present disclosure, the second electronic device includes a STB.

In an aspect of the present disclosure, the network interface is configured to receive the search command from a second electronic device in the wireless network, wherein the first communication connection is a short-range connection that operates in accordance with Bluetooth or Radio Frequency for Consumer Electronics (RF4CE) protocols, and the second electronic device includes a remote control unit.

In an aspect of the present disclosure, the network interface is configured to broadcast the search command using the second communication connection via the network interface to one or more third electronic devices in the wireless network. The second communication connection is a back channel connection that operates in accordance with Wi-Fi or Ethernet protocols, and the one or more third electronic devices either identify as the paired device, or broadcast the search command over the wireless network for receipt by the paired device.

In an aspect of the present disclosure, the one or more third electronic devices include a STB.

An aspect of the present disclosure provides a method for locating and identifying a paired device in a wireless network. The wireless network communicatively connects a plurality of electronic devices including the paired device. The method includes receiving by a first electronic device, using a first communication connection, a search command including identifying information of the paired device as a peer device, and determining, using the first electronic device, whether the identifying information in the search command for the peer device matches identifying information of the electronic device.

When the identifying information in the search command for the peer device matches identifying information of the first electronic device, the first electronic device is identified as the paired device. When the identifying information in the search command for the peer device does not match the identifying information of the electronic device, the first electronic device broadcasts, using a second communication connection, the search command to the wireless network.

In an aspect of the present disclosure, the search command received by the first electronic device is from a second electronic device in the wireless network, and the first communication connection includes a back channel connection that operates in accordance with Wi-Fi or Ethernet protocols.

In an aspect of the present disclosure, the search command received by the first electronic device is from a second electronic device in the wireless network, the first communication connection includes a short-range connection that operates in accordance with Bluetooth or RF4CE protocols, and the second electronic device includes a remote control unit.

In an aspect of the present disclosure, broadcasting the search command from the first electronic device, using a second communication connection, includes broadcasting to one or more third electronic devices in the wireless network. Moreover, the second communication connection is a back channel connection that operates in accordance with Wi-Fi or Ethernet protocols, and the one or more third electronic devices either identify as the paired device, or broadcast the search command over the wireless network for receipt by the paired device.

An aspect of the present disclosure provides a non-transitory computer-readable recording medium in a first electronic device for locating and identifying a paired device in a wireless network. The wireless network communicatively connects a plurality of electronic devices including the first electronic device and the paired device. The non-transitory computer-readable recording medium stores one or more programs which when executed by a hardware processor performs the steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various exemplary embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
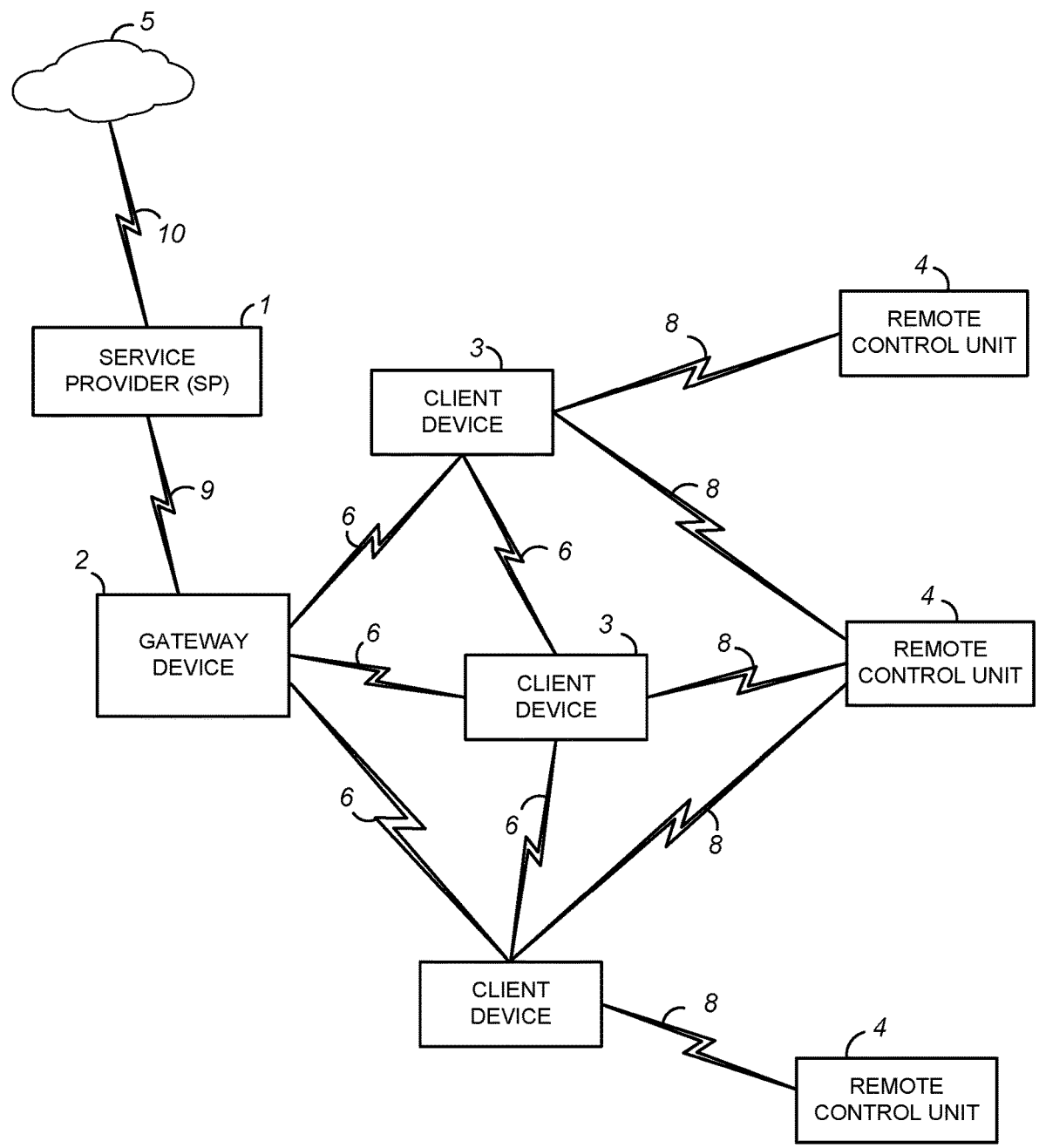
FIG. 1 is a schematic diagram of a system according to an embodiment of the present disclosure.

FIG. 1 is a schematic diagram of a system according to an embodiment of the present disclosure.

As shown in FIG. 1, the main elements of the system include a gateway device 2 connected to the Internet 5 via a Service Provider (SP) 1 and also connected to different wireless devices such as client devices 3. Each client device 3 is paired to only one of the remote control units 4. Likewise, each remote control unit 4 is paired to only one of the client devices 3. Thus, each client device 3 and corresponding remote control unit 4 form, for example, a client device-remote control unit pair. Moreover, each of the client devices 3 can be in a different location such as in a different room in a home or office building. The remote control unit 4 is typically located in the same room or location as the client device 3 to which it is paired. However, sometimes a remote control unit may be located in a different room or location than the client device 3 to which it is paired.

The system shown in FIG. 1 includes wireless devices (e.g., client devices 3 and remote control units 4) that may be connected in one or more wireless networks (e.g., private, guest, iControl, backhaul network, or Internet of things (IoT) network) within the system. Additionally, there could be some overlap between wireless devices (e.g., client devices 3 and remote control units 4) in the different networks.

In FIG. 1, the SP 1 can be, for example, a streaming video provider or any computer for connecting the gateway device 2 to the Internet 5. Additionally, the SP can also be a multi-system operator (MSO) that provides one or more cable television and Internet services. The connection 10 between the Internet 6 and the SP 1 and connection 9 between the Internet 5 and the gateway device 2 can be implemented using a wide area network (WAN), a virtual private network (VPN), metropolitan area networks (MANs), private area networks (PANs), system area networks (SANs), a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 9 can further include as some portion thereof a broadband mobile phone network connection, an optical network connection, or other similar connections. For example, the connection 9 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 9 is capable of providing connections between the gateway device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The gateway device 2 can be, for example, a hardware electronic device that may be a combination of a set-top box (STB), modem, and gateway that combines the functions of a modem, access point and/or a router for providing content received from the SP 1 to network devices (e.g., client devices 4) in the system. It is also contemplated by the present disclosure that the gateway device 2 can include the function of, but is not limited to, an Internet Protocol/Quadrature Amplitude Modulator (IP/QAM) STB or smart media device (SMD) that is capable of decoding audio/video content, and capable of playing over-the-top (OTT) or multiple system operator (MSO) provided content.

The connection 6 between the gateway device 2 and the client devices 3, and between the client devices 3 may be implemented through a wireless connection that operates in accordance with, but is not limited to, IEEE 802.11 protocol. The connection 6 can also be implemented using a wireless connection in accordance with any IEEE 802.11 Wi-Fi protocols, Bluetooth protocols, Bluetooth Low Energy (BLE), or other short-range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands.

The connection 6 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 6 can include connections to a media over coax (MoCA) network. Additionally, one or more of the connections 6 can also be a wired Ethernet connection.

The client devices 3 can be, for example, an IP/QAM STB or SMD that is capable of decoding audio/video content, and capable of decoding OTT or MSO provided content. Additionally, the client devices 3 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the gateway device 2. It is contemplated by the present disclosure that the functions of the client devices 3 when operating as OTT STBs can be performed by the gateway device 2 when the gateway device 2 is operating as an OTT STB or even when the gateway device 2 is operating as a standard STB with wireless communication (e.g., Wi-Fi, Bluetooth, etc.,) functionality.

The connection 8 between the client devices 3 and the remote control units 4 can be implemented using a wireless connection in accordance with any IEEE 802.11 Wi-Fi protocols, Bluetooth protocols, Bluetooth Low Energy (BLE), or other short-range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 8 can be implemented using a wireless connection that operates in accordance with, but is not limited to, RF4CE protocol, ZigBee protocol, Z-Wave protocol, or IEEE 802.15.4 protocol. The remote control units 4 can be, for example, remote control units used to operate an electronic device such as a STB, TV, IoT devices, iControl devices, or other similar electronic devices capable of communicating via connection 8 with the client devices 3.

Figure 2:
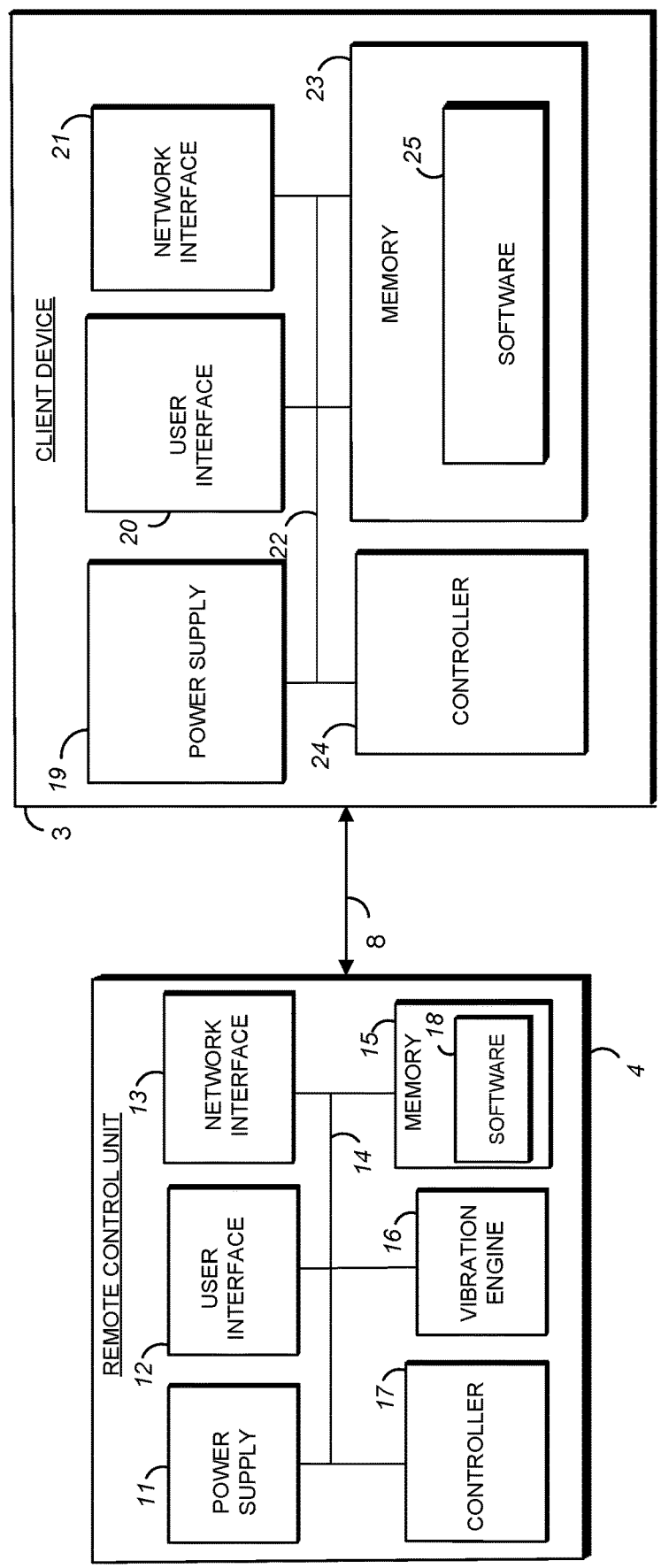
FIG. 2 is a more detailed schematic diagram illustrating an exemplary client device and remote control unit (RCU) implemented in the system of FIG. 1 according to an embodiment of the present disclosure.

A detailed description of the exemplary internal components of the client devices 3 and the remote control units 4 shown in FIG. 1 will be provided in the discussion of FIG. 2. However, in general, it is contemplated by the present disclosure that the client devices 3 and remote control units 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the client devices 3 and remote control units 4 may be adapted to execute any operating system, including Linux, UNIX, Windows, MacOS, DOS, and ChromOS as well as virtual machines adapted to virtualize execution of a particular operating system, including customized and proprietary operating systems. The client devices 3 and remote control units 4 are further equipped with components to facilitate communication with other computing devices over the one or more network connections to local and wide area networks, wireless and wired networks, public and private networks, and any other communication network enabling communication in the system.

FIG. 2 is a more detailed schematic diagram illustrating an exemplary client device 3 and a remote control unit 4 pair according to an embodiment of the present disclosure. Although, FIG. 2 shows only one client device 3 and only one remote control unit 4, it is contemplated by the present disclosure that more than one client device 3 and more than one remote control unit 4 can be implemented. The client devices 3 and the remote control units 4 shown in FIGS. 1 and 2 are meant to be representative of the network devices that can be implemented to achieve the features of the different aspects and embodiments described in the present disclosure.

Now referring to FIG. 2, the remote control unit 4 can be, for example, a remote control unit used to operate an electronic device such as a STB, TV, IoT devices, iControl devices, or other similar consumer electronic devices capable of communicating via connection 8 with the client devices 3. As shown in FIG. 2, the remote control unit 4 includes a power supply 11, a user interface 12, a network interface 13, a memory 15, a vibration engine 16 and a controller 17. The power supply 11 supplies power to the internal components of the remote control unit 4 through the internal bus 14. The power supply 11 can be a self-contained power source such as a battery pack with an interface to be powered through an electrical charger connected to an outlet (e.g., either directly or by way of another device). The power supply 11 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 12 includes, but is not limited to, push buttons, a keyboard, a keypad, a speaker for emitting beeps and other audio features, a liquid crystal display (LCD), a thin film transistor (TFT), a light-emitting diode (LED), a high definition (HD) or other similar display device including a display device having touch screen capabilities so as to allow interaction between a user and the remote control unit 4. The network interface 13 includes various network cards, and circuitry implemented in software and/or hardware to enable communications using the communication protocols of connection 8 (e.g., as previously described with reference to FIG. 1).

The memory 15 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 15 can be used to store data, for example, data regarding the client device 3 to which the remote control unit 4 is paired. Such data may include, but is not limited to, a Media Access Control (MAC) address of the paired client device 3.

Additionally, the memory 15 can be used to store any type of software 18 or instructions, for example, client device search software for implementing a search function for locating and identifying which one of several client devices 3 is paired to the remote control unit 4. Such a search function may be referred to as a CD search function. Moreover, the memory 15 can be used to store any software or instructions related to searching for electronic devices and software associated with algorithms, processes, or operations for controlling the general functions and operations of the remote control unit 4. The vibration engine 16 may be, for example, an electric motor having an axle to which a weight is attached. The axes of the axle and the weight are offset from each other such that upon activation the motor spins the weight which causes vibrations. Alternatively, the vibration engine 16 may be, for example, any type of transducer that converts electrical energy into mechanical vibrations.

The controller 17 controls the general operations of the remote control unit 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the remote control unit 4. Communication between the components (e.g., 11-13 and 15-17) of the remote control unit 4 is established using the internal bus 14.

The client device 3 can be, for example, an IP/QAM STB or SMD that is capable of decoding audio/video content, and cable of playing OTT or MSO provided content. Additionally, the client device 3 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the gateway device 2. As shown in FIG. 2, the client device 3 includes a power supply 19, a user interface 20, a network interface 21, a memory 23, and a controller 24.

The power supply 19 supplies power to the internal components of the client device 4 through the internal bus 22. The power supply 19 can be a self-contained power source such as a battery pack with an interface to be powered through an electrical charger connected to an outlet (e.g., either directly or by way of another device). The power supply 19 can also include a rechargeable battery that can be detached allowing for replacement such as a NiCd, a NiMH, a Li-ion, or a Li-pol battery.

The user interface 20 includes, but is not limited to, push buttons, a keyboard, a keypad, a speaker for emitting beeps and other audio features, an LCD, a TFT, an LED, an HD or other similar display device including a display device having touch screen capabilities so as to allow interaction between a user and the client device 3. The network interface 21 includes various network cards, and circuitry implemented in software and/or hardware to enable communications using the communication protocols of connection 8 (e.g., as previously described with reference to FIG. 1). The memory 23 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 23 can be implemented to store any type of data, for example, data regarding the remote control unit 4 to which the client device 3 is paired. Such data may include, but is not limited to, a MAC address of the paired remote control unit 4.

Additionally, the memory 23 can be implemented to store software 25 or instructions, for example, remote control unit search software for implementing search functions for the remote control unit 4 paired to the client device 3 as well as any other software related to searching for electronic devices. Such a search function may be referred to as a RCU search function. Alternatively, the search function may be referred to as an STB search function when the client device 3 is, for example, an STB. Moreover, the memory 23 can be implemented to store any software 25 or instructions related to searching for electronic devices and software associated with algorithms, processes, or operations for controlling the general functions and operations of the client device 3.

The controller 24 controls the general operations of the client device 3 and includes, but is not limited to, a CPU, a hardware microprocessor, a multi-core processor, a single core processor, a FPGA, a microcontroller, an ASIC, a DSP, or other similar processing device capable of executing any type of instructions, algorithms, or software for controlling the operation and performing the functions of the client device 3. Communication between the components (e.g., 19-21, 23 and 24) of the client device 3 is established using the internal bus 22. Although remote control unit search software 25 is stored in the memory 23 of the client device 3 and client device search software 18 is stored in the memory 15 of the remote control unit 4, it is contemplated by the present disclosure that a single search program or software capable of performing the operations of the remote control unit search software and of the client device search software, as well as other operations described herein, may alternatively or additionally be stored in the memory 15 of the remote control unit 4 and in the memory 23 of the client device 3.

Figure 3A:
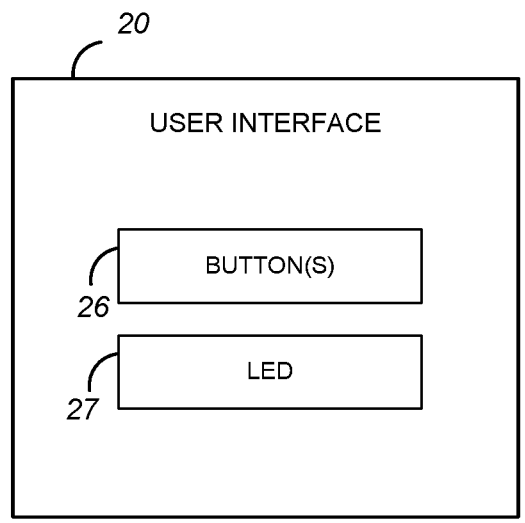
FIG. 3A is a schematic diagram illustrating an exemplary user interface for the client device according to an embodiment of the present disclosure.
Figure 3B:
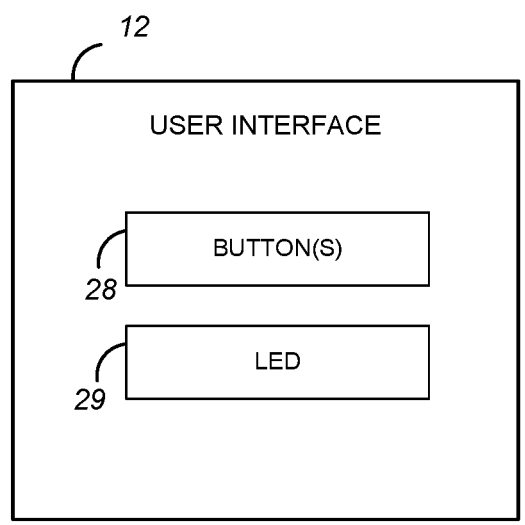
FIG. 3B is a schematic diagram illustrating an exemplary user interface for the RCU according to an embodiment of the present disclosure.

FIGS. 3A and 3B illustrate exemplary user interfaces according to embodiments of the present disclosure. FIG. 3A is a schematic diagram illustrating an exemplary user interface 20 of a client device 3 implemented in the system of FIG. 1 according to an embodiment of the present disclosure. As shown in FIG. 3A, the user interface 20 of the client device 3 may include a physical button 26 and a visual element such as a light emitting diode (LED) 27. It is contemplated by the present disclosure that the button 26 can be, for example, a dedicated button operated to initiate a search function for locating a remote control unit 4 paired to the client device 3. For example, the button 26 on the user interface 20 could be a dedicated search button labeled "search," "find," "locate," or other label for initiating the search function.

Although the button 26 for initiating the search function is referred to in this example as a dedicated search button, it is by no means limited to this and the search function can be initiated using any button or combination of buttons on the client device 3. For example, the button 26 could also have another function (e.g., WPS, Wi-Fi, or any other Wi-Fi related function), wherein the search function is initiated by using a predetermined pressing operation (e.g., different from the other function). Additionally, although FIG. 3A shows an LED 27, it is contemplated by the present disclosure that virtually any light or visual elements could be implemented on the user interface 20 and the indication of the search function could be represented by any visual indication by the light or visual elements.

A search function may be the RCU search function implemented by the software 25 stored in the memory 23 of the client device 3. While the client device 3 implements the RCU search function, the LED 27 can provide an indication that the RCU search is being conducted on the client device 3. There may be occasions when a user is unable to locate the remote control unit 4 paired to the client device 3. For example, if the remote control unit 4 and client device 3 are in different rooms or if the remote control unit 4 is out of range of the client device 3, there is no signal or connection that can be established between them. By operating the button 26 (e.g., short-clicking, pressing a number of times, or pressing continuously for a time period), the user causes the client device 3 to initiate a search mode and implement a RCU search function to find the remote control unit 4. The initiating of the search mode could be indicated by the activation of the LED 27 (e.g., to blink or remain continuously illuminated) while the RCU search is conducted. It is contemplated by the present disclosure that any clicking or pressing operations can be implemented to initiate the search function and the clicking or pressing can be performed using any button or combination of buttons on the client device 3.

FIG. 3B is a schematic diagram illustrating an exemplary user interface 12 of the remote control unit 4 implemented in the system of FIG. 1 according to an embodiment of the present disclosure. As shown in FIG. 3B, the user interface 12 of the remote control unit 4 may include a physical button 28, and a visual element such as a LED 29. It is contemplated by the present disclosure that the button 28 can be, for example, a dedicated button that is used to initiate a search function for determining which one of several client devices 3 is paired to the remote control unit 4. For example, the button 28 could be a dedicated search button labeled "search," "find," "locate," "BT," or other label for initiating the search function using, for example, a Bluetooth protocol such as BLE or RF4CE protocol.

Although the button 28 for initiating the search function is referred to in this example as a dedicated search button, it is by no means limited to this and the search function can be initiated using any button or combination of buttons on the remote control unit 4. For example, the button 28 could also have another function, wherein the search function is initiated by using a predetermined pressing operation (e.g., different from the other function). Additionally, FIG. 3B shows an LED 29, however, it is contemplated by the present disclosure that any light or visual elements could implemented on the user interface 12 and the indication of the search function could be represented by any visual indication by the light or visual elements.

A search function may be the CD search function implemented by the software 18 stored in the memory 15 of the remote control unit 4. Alternatively, the search function may be referred to as a STB search function when the client device 3 is, for example, a set-top-box (STB). Just as there may be occasions when a user is unable to locate the remote control unit 4 paired to the client device 3, there may be occasions when the user may be unable to locate and identify one of several client devices 3 to which a remote control unit 4 is paired. For example, the user may own several client devices 3 and not know which one is paired to a particular remote control unit 4. By operating the button 28 (e.g., short-clicking, pressing a number of times, or pressing continuously for a time period), the user causes the remote control unit 4 to implement the CD search function. It is contemplated by the present disclosure that any clicking or pressing operations can be implemented to initiate the search function, and the clicking or pressing can be performed using any button or combination of buttons of the remote control unit 4.

Although the buttons 26, 28 are described herein as being physical buttons, it is contemplated by the present disclosure that the buttons 26, 28 may alternatively be virtual buttons included in a Graphical User Interface (GUI) displayed by the respective user interface. Such virtual buttons may be pressed by users to implement a search function. The electronic device that implements a search function is called the initiator and the object of the search is called the peer. The object of the search is typically another electronic device. The electronic device on which, for example, the button 26, 28 is operated typically initiates the search function and is thus set as the initiator. Thus, for searches implemented by the remote control unit 4, the remote control unit 4 is the initiator and the paired control device 3 is the peer. Additionally, for searches implemented by the client device 3, the client device is the initiator and the remote control unit 4 is the peer.

Both the remote control unit 4 and the client device 3 are considered to be electronic devices that implement their respective search functions by issuing a search command that identifies the initiator of the search and the peer, for example, as (initiator, peer). For example, the search command for a search conducted by a client device (CD) for locating the paired remote control unit (RCU) may identify the initiator and peer, for example, as (CD, RCU). The details of implementing the search functions will be discussed in detail with reference to FIGS. 4-6.

Figure 4:
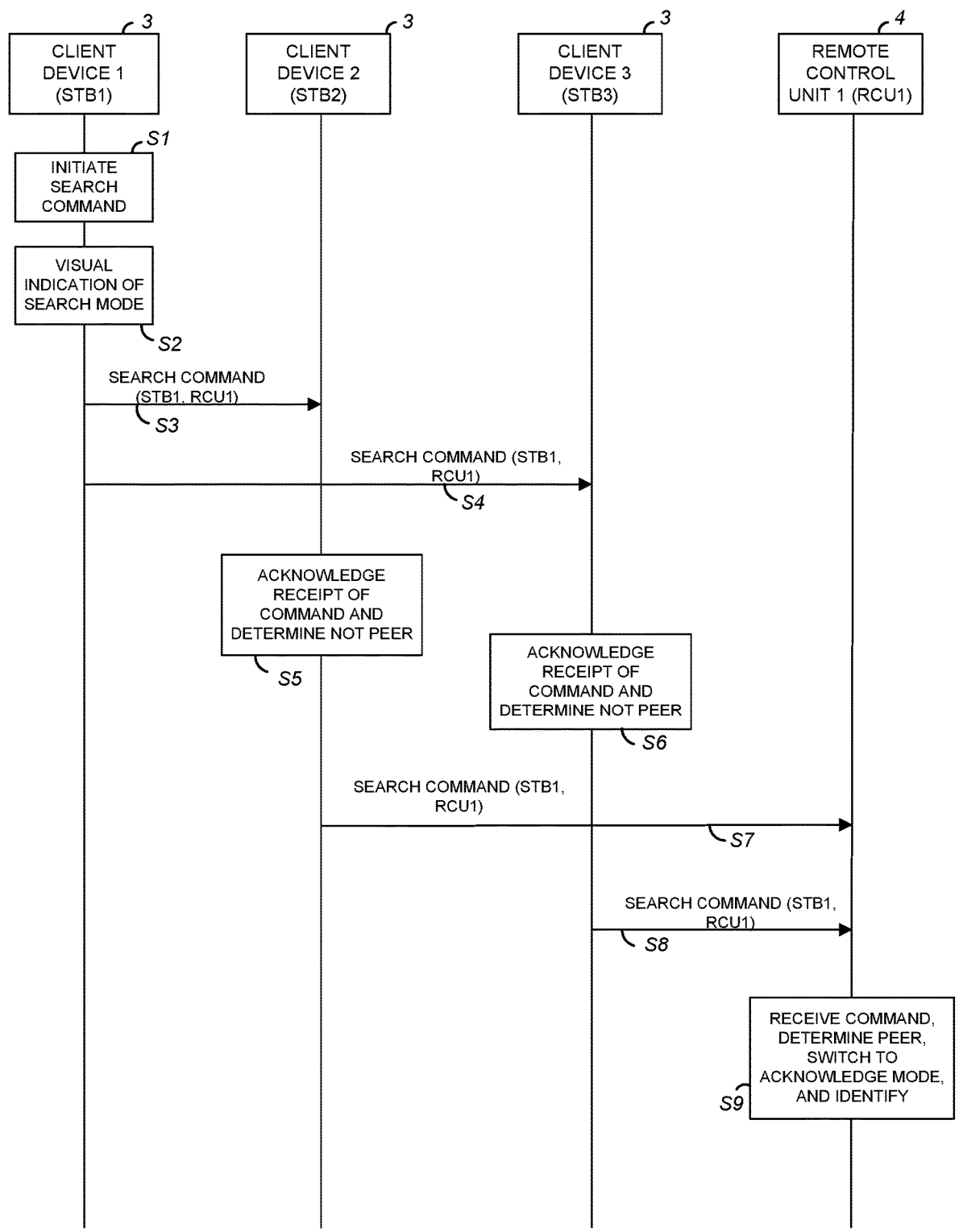
FIG. 4 is an exemplary method and algorithm for locating and identifying a paired remote control unit for a STB according to an embodiment of the present disclosure.

FIG. 4 is an exemplary method and algorithm for locating and identifying a paired remote control unit for a client device 3 according to an embodiment of the present disclosure. As shown in FIG. 4, the client devices 3 in this example are set-top-boxes (STBs) (e.g., STB1-STB3) and the remote control unit 4 (e.g., RCU1) is paired with a particular STB (e.g., STB1). In the description of FIG. 4, the client devices 3 will be referred after as STB1, STB2, and STB3; and the remote control unit 4 will be referred to RCU1. FIG. 4 illustrates exemplary operations performed by STB1, STB2, STB3, and RCU1 when STB1 implements a RCU search function. That is, operations performed by STB1 when a user cannot locate RCU1 paired to STB1 or RCU1 is out of range of STB1 and there is no signal or connection that can be established between them.

In step S1, the search function software 25 is executed by the controller 24 and causes STB1 to initiate a RCU search function based on a signal received via the user interface 20 (e.g., as shown in FIG. 3A). To initiate a search mode and the RCU search function, the user can, for example, short-click the physical button 26 on the user interface 20. Although "short-clicking" is described, it is contemplated by the present disclosure that any clicking or pressing operations can be implemented to initiate the search function. In the example provided by FIG. 4, the initiator of the search command is STB1 and the peer is RCU1, which is paired to STB1.

In step S2, the search function software 25 executed by the controller 24 causes a visual indication on STB1. For example, the LED 27 on the user interface 20 will blink or remain illuminated indicating that STB1 is in a search mode. Additionally, in steps S3 and S4, the software 25 executed by the controller 24 causes STB1 to generate and broadcast a search command to STB2 and STB3. For example, STB1 repeatedly multicasts the search command (e.g., (STB1, RCU1)) to STB2 and STB3 using the network interface 21 and the connection 6. In this example, the search command can be multicast broadcasted by STB1 using the back channel connection via connection 6 to STB2 and STB3 using, for example, a Wi-Fi or an Ethernet connection. STB1 can repeatedly multicast the search command for a predetermined period of time unless a response is received from RCU1 or the button 26 is again operated (e.g., short-clicked). The predetermined period of time may be 5 minutes or any period of time deemed adequate to find RCU1 as a result of the multicast broadcast.

The following is exemplary code or software 25 that can be executed by STB1 for initiating the search function:

```
My MAC = get_my_Bluetooth_MAC( )
My PEER = get_paired_RCU1_MAC( )
while(True) {
    BTButton = poll_for_bt_click( )
    set_state(SEARCHING);
    while (!shoud_terminate) {
        SearchCommand = new (initiator: MAC, peer: PEER)
        broadcast_to_network(SearchCommand);
        broadcast_to_ble_advertisement(SearchCommand);
        if (timeout or poll_for_bt_click( ) or poll_for_bt_keycode) {
            shoud_terminate = true
        } else {
        Sleep(1second)
        }
    }
}.
```

In step S5, the software 25 executed by the controller 24 causes STB2 to listen for search commands and receive the search command broadcast by STB1 using the network interface 21 and connection 6 (e.g., back channel connection). Next, the controller 24 of STB2 determines the peer, RCU1, included in the search command is not paired with or a peer of STB2. Likewise, in step S6, the software 25 executed by the controller 24 causes STB3 to listen for search commands and receive the search command broadcast by STB1 using the network interface 21 and connection 6 (e.g., back channel connection). The controller 24 of STB3 determines that the peer, RCU1, included in the search command is not paired with or a peer of STB3.

In step S7, the software 25 executed by the controller 24 causes STB2 to broadcast or rebroadcast the search command using the network interface 21 and the connection 8. Likewise, in step S8, the software 25 executed by the controller 24 causes STB3 to broadcast or rebroadcast the search command using the network interface 21 and the connection 8. Broadcasting or rebroadcasting of the search command from STB2 and STB3 increases the range of STB1 when attempting to locate and identify RCU1.

The following is an example of code or software 25 that can be executed by STB2 and STB3 for listening for and receiving search commands, determining whether or not the peer included in a search command is a match, and broadcasting or rebroadcasting the search command:

```
My MAC = get_my_Bluetooth_MAC( )
While(True) {
    SearchCommand = wait_for_search_command_from_net( )
    if (MAC eq SearchCommand ->peer) {
        set_state(ACKNOWLEDGED);
        set_led(blink);
```
```
    } else if (MAC ne SearchCommand ->initiator) {
        broadcast_to_ble_advertisement(SearchCommand);
    }
    else
        { broadcast_BleAdvertisement( SearchCommand) }
}.
```

The above code is executed by STB2 and STB3, and causes each to listen for search commands on the network and on reception would confirm if RCU1 for which the search is issued is paired to it. If yes, the paired STB2 or STB3 would respond immediately. If not, STB2 and/or STB3 would broadcast or rebroadcast the search command to continue the search for RCU1.

Next, in step S9, the software 18 executed by the controller 17 causes RCU1 to listen for a search command, receive the search commands broadcast by STB2 and STB3 using the network interface 13, and determine that the peer RCU1 included in the search command is a match. That is, RCU1 determines that it is the remote control unit in the search command. Next, the software 18 executed by the controller 17 causes RCU1 to switch to the acknowledge mode and identify itself as the remote control included in the search command. For example, RCU1 can vibrate using vibration engine 16 or provide a visual or an audio response using the user interface 12 (e.g., LED 29 or emitting a beep or other audio signal). RCU1 can also provide any combination of mechanical, visual, and audio responses to facilitate discovery of RCU1. For example, the RCU1 can perform any combination of vibrating, blinking, and beeping to facilitate discovery.

The following is an example of code or software 18 executed by RCU1 for listening for and receiving a search command, switching to acknowledge mode, and identifying as the peer:

```
My MAC = get_my_Bluetooth_MAC( )
while(True) {
    SearchCommand = wait_for_search_command_from_BLE( )
    if (MAC eq SearchCommand ->peer) {
        set_state(ACKNOWLEDGED);
        set_led(blink);
        set_beeper_or_vibrator( );
    }
}.
```

The method and algorithm of FIG. 4 provides a quick, easy, convenient, and inexpensive search function to locate the remote control unit 4 paired with a client device 3 that is lost or misplaced in a home or office.

Figure 5:
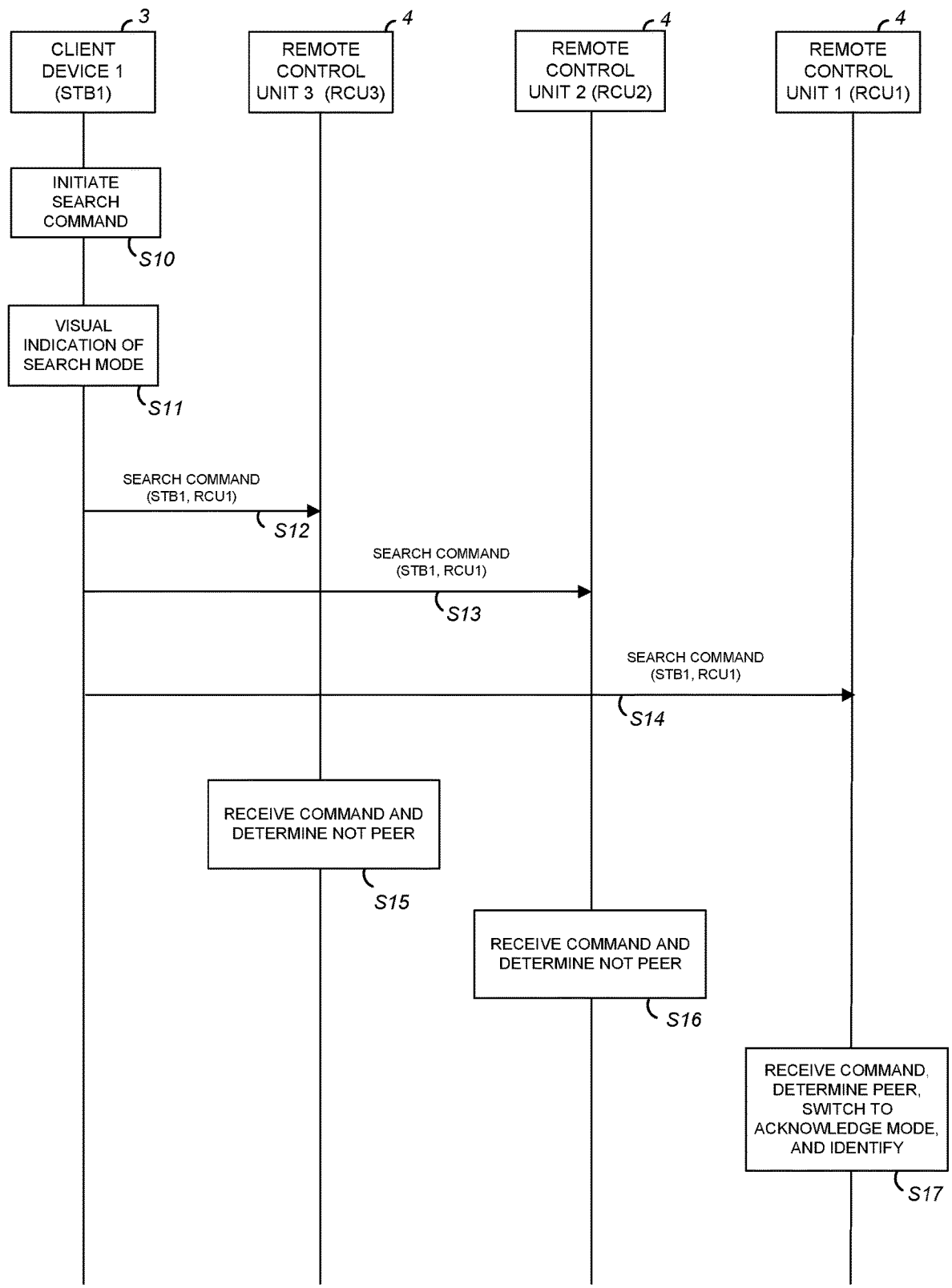
FIG. 5 is an exemplary method and algorithm for locating and identifying paired RCU for a STB according to an embodiment of the present disclosure.

FIG. 5 is an exemplary method and algorithm for locating and identifying a paired remote control unit 4 for a client device 3 according to an embodiment of the present disclosure. As shown in FIG. 5, the client device 3 in this example is a set-top-box (STB) (e.g., STB1), and the remote control unit 4 (e.g., RCU1) is paired with a particular STB (e.g., STB1). In the description of FIG. 5, the client device 3 will be referred after as STB1, and the remote control units 4 will be referred to RCU1, RCU2, and RCU3.

FIG. 5 illustrates exemplary operations performed by STB1, RCU1, RCU2, and RCU3 when STB1 implements the RCU search function. That is, operations performed by STB1 when the user cannot determine which one of several remote control units (e.g., RCU1-RCU3) is paired to STB1.

In step S10, the search function software 25 executed by the controller 24 causes STB1 to initiate a RCU search function based on a signal received via the user interface 20 (e.g., as shown in FIG. 3A). For example, to initiate the RCU search function, the user can, for example, short-click the physical button 26 on the user interface 20. Although "short-clicking" is described, it is contemplated by the present disclosure that any clicking or pressing operations can be implemented to initiate the search function. In the example provided by FIG. 5, the initiator of the search command is STB1 and the peer is RCU1, which is paired to STB1.

In step S11, the search function software 25 executed by the controller 24 causes a visual indication on STB1. For example, the LED 27 on the user interface 20 will blink or remain illuminated indicating that STB1 is in a search mode. In steps S12, S13, and S14, the software 24 executed by the controller 25 causes STB1 to generate a search command to RCU1, RCU2, and RCU3. For example, STB1 repeatedly multicasts the search command (e.g., STB1, RCU1) to RCU1, RCU2, and RCU3 using the network interface 21 and the connection 8. STB1 can repeatedly multicast the search command for a predetermined period of time unless a response is received from RCU1 or the button 26 is again operated (e.g., shorted-clicked). The predetermined period of time may be 5 minutes or any period of time deemed adequate for a user to find RCU1 as a result of the multicast broadcast. The initiator of the search command is STB1 and the peer is RCU1.

The following is an example of code or software 25 executed by STB1 for initiating the search function, and generating and broadcasting the search command:

```
My MAC = get_my_Bluetooth_MAC( )
My PEER = get_paired_RCU1_MAC( )
while(True) {
    BTButton = poll_for_bt_click( )
    set_state(SEARCHING);
    while (!shoud_terminate) {
        SearchCommand = new (initiator: MAC, peer: PEER)
        broadcast_to_network(SearchCommand);
        broadcast_to_ble_advertisement(SearchCommand);
        if (timeout or poll_for_bt_click( ) or poll_for_bt_keycode) {
            shoud_terminate = true
        } else {
            Sleep(1second)
        }
    }
}.
```

In step S15, the software 18 executed by the controller 17 causes RCU2 to listen for and receive the search command using the network interface 13 and connection 8, and determine the peer included in the search command is not a match. In step S16, the software 18 executed by the controller 17 causes RCU3 to listen for and receive the search command using the network interface 13 and connection 8, and determine the peer included in the search command is not a match.

In step S17, the software 18 executed by the controller 17 causes RCU1 to listen for and receive the search command using the network interface 13 and connection 8, and determine the peer included in the search command is a match. That is, RCU1 determines that it is the remote control unit included in the search command. The software 18 executed by the controller 17 causes RCU1 to switch to the acknowledged mode and identify itself as the remote control included in the search command. For example, RCU1 can vibrate using vibration engine 16 or provide a visual or an audio response using the user interface 12 (e.g., LED 29 or emitting a beep or signal). RCU1 can also provide any combination of a mechanical, visual, and audio response to facilitate discovery of RCU1. The vibrations of the vibration engine 16, the blinking of the LED 29, and/or the beeps emitted from the speakers in the user interface 12 can be heard and/or observed by the user so that the user will be able to locate and identify RCU1.

The following is an example of code or software 18 executed by RCU1 for listening for and receiving a search command and switching to the acknowledge mode:

```
My MAC = get_my_Bluetooth_MAC( )
while(True) {
    SearchCommand = wait_for_search_command_from_BLE( )
    if (MAC eq SearchCommand ->peer) {
        set_state(ACKNOWLEDGED);
        set_led(blink);
        set_beeper_or_vibrator( );
    }
}.
```

The method and algorithm of FIG. 5 provides a quick, easy, convenient, and inexpensive search function to locate and identify a remote control unit among several remote control units that is paired to a client device.

Figure 6:
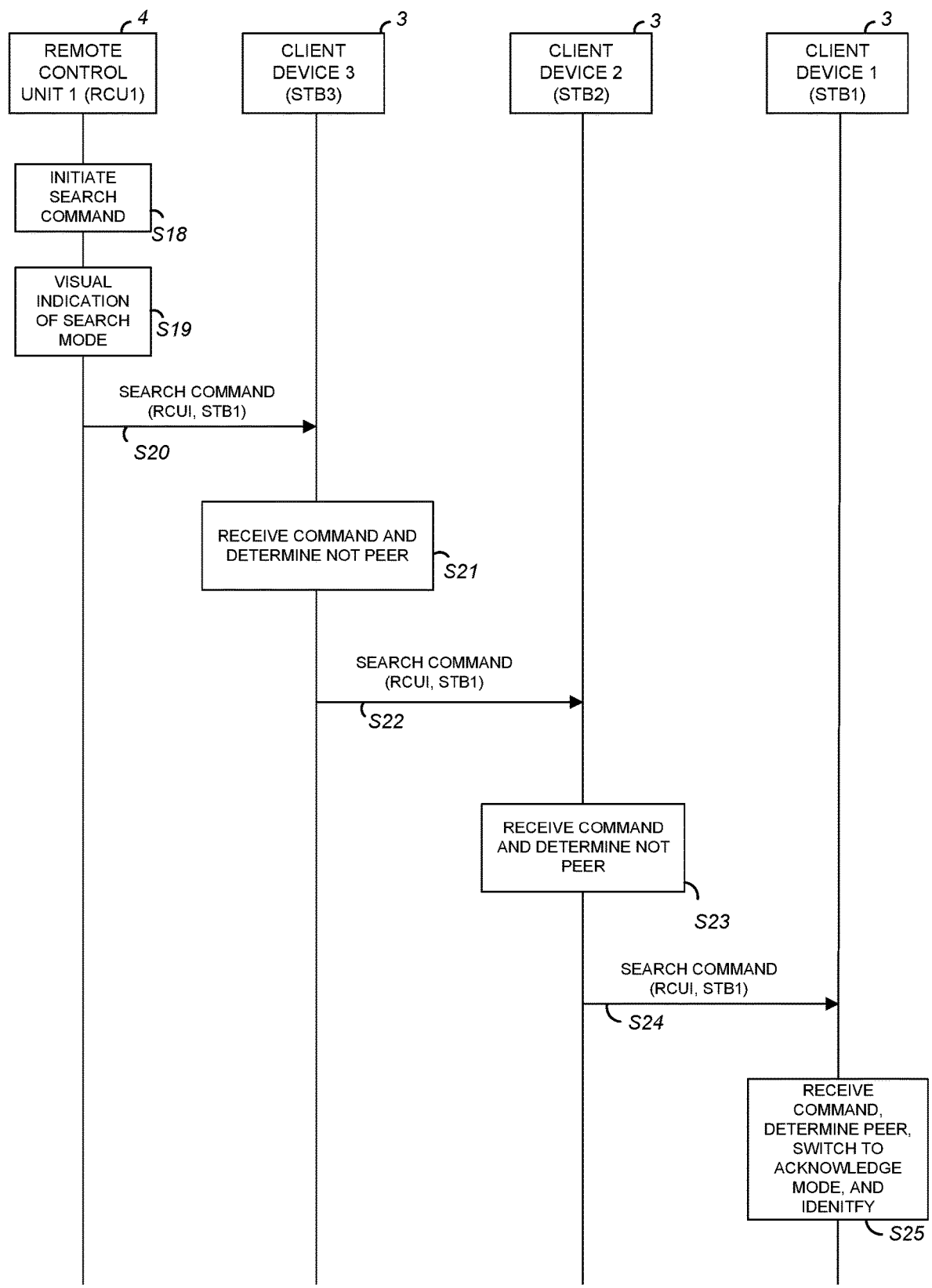
FIG. 6 is an exemplary method and algorithm for locating and identifying a paired STB for a RCU according to an embodiment of the present disclosure.

FIG. 6 is an exemplary method and algorithm for locating and identifying a paired client device 3 for a remote control unit 4 according to an embodiment of the present disclosure. As shown in FIG. 6, the client devices 3 in this example are STBs (e.g., STB1-STB3) and the remote control unit 4 (e.g., RCU1) is paired with a particular STB (e.g., STB1). In the description of FIG. 6, the client devices 3 will be referred after as STB1, STB2, and STB3; and the remote control unit 4 will be referred to RCU1.

FIG. 6 illustrates exemplary operations performed by RCU1, STB1, STB2, and STB3 when RCU1 implements a STB search function. That is, the operations performed by RCU1 when a user cannot locate and identify the STB (e.g., STB1) paired to RCU1 from several different STBs (e.g., STB1-STB3). In order to locate and identify STB1, the user may cause RCU1 to run the STB search function software by first operating the button 28 (e.g., short-clicking).

In step S18, the search function software 18 executed by the controller 17 causes RCU1 to initiate a STB search function based on a signal received via the user interface 12 (e.g., as shown in FIG. 3B). For example, to initiate the STB search function, the user can, for example, short-click the physical button 28. Although "short-clicking" of button 28 is described, it is contemplated by the present disclosure that any clicking or pressing operation can be implemented using any button or any combination of buttons on RCU1 to initiate the search function. In the example provided by FIG. 6, the initiator of the search command is RCU1 and the peer is STB1, which is paired to RCU1.

In step S19, the software 18 executed by the controller 17 causes a visual indication on RCU1. For example, the LED 29 on the user interface 12 will blink or remain illuminated indicating that RCU1 is in a search mode. In step S20, the software 18 executed by the controller 17 causes RCU1 to generate a search command and broadcast the search command to STB3. For example, RCU1 repeatedly broadcasts the search command to STB3 using the network interface 13 and the connection 8. The search command is received by STB3, which is within range of RCU1. Although FIG. 6 only shows STB3 as being initially within the transmitted range of RCU1, it is contemplated by the present disclosure that any number of STBs (e.g., STB1-STB3) may be within range of RCU1 to receive the broadcast search command.

RCU1 can repeatedly broadcast the search command for a predetermined period of time unless a response is received from STB1 or the button 28 is again operated. The predetermined period of time may be 5 minutes or any period of time deemed adequate for a user to find STB1 as a result of the broadcast. The following is an example of code or software 18 executed by RCU1 for initiating the search function and generating and broadcasting the search command:

```
My MAC = get_my_Bluetooth_MAC( )
My PEER = get_paired_STB_MAC( )
while(True) {
   BTKey = poll_for_bt_click ( )
   set_state(SEARCHING);
   while (!shoud_terminate) {
      SearchCommand = new (initiator: MAC, peer: PEER)
      broadcast_to_ble_advertisement(SearchCommand);
      if (timeout or poll_for_bt_click( )) {
         shoud_terminate = true
      } else {
         Sleep(1second)
      }
   }
}.
```

This code executes on the RCU1, which listens for a button operation and on detecting such operation initiates a search for STB1. Next, in step S21, the software 25 executed by the controller 24 causes STB3 to listen for search commands from RCU1, receive the search command using the network interface 21 and connection 8, and determine the peer included in the search command is not a match. In step S22, the software 25 executed by the controller 24 causes STB3 to broadcast or rebroadcast the search command. More specifically, the software 25 executed by the controller 24 causes STB3 to broadcast or rebroadcast the search command using the network interface 21 and the connection 6. In this example, the search command is broadcasted or rebroadcasted by STB3 using the back channel connection via connection 6 to STB2 using, for example, a Wi-Fi or an Ethernet connection.

Next, in step S23, the software 25 executed by the controller 24 of STB2 causes it to listen for search commands from RCU1, receive the search command from RCU1 using the network interface 21 and connection 6 (e.g., the back channel), and determine the peer included in the search command is not a match. In step S24, STB2 broadcasts or rebroadcasts the search command. More specifically, the software 25 executed by the controller 24 causes STB2 to broadcast or rebroadcast the search command using the network interface 21 and the connection 6. In this example, the search command is broadcasted or rebroadcasted by STB2 using the back channel connection via connection 6 to STB1 using, for example, a Wi-Fi or an Ethernet connection. The following is an example of code or software executed by STB2 and STB3 to listen for and receive search commands from RCU1, determine the peer included in the command is not a match, and broadcast the search command:

```
My MAC = get_my_Bluetooth_MAC( )
while(True) {
   SearchCommand = wait_for_search_command_from_BLE( )
   if (MAC eq SearchCommand ->peer) {
      set_state(ACKNOWLEDGED);
      set_led(blink);
   } else {
      broadcast_to_network(SearchCommand);
   }
}.
```

The above code is executed by STB3 and STB2, which continuously listen for search commands from a remote control unit (e.g., RCU1). If the search was issued by a remote control unit paired with one of the STBs (e.g., STB3 or STB2), then the paired STB would respond immediately. If not, the STBs (e.g., STB3 or STB2) would broadcast the search to other STBs (e.g., STB1) in the network.

In step S25, the software 25 executed by the controller 24 of STB1 causes it to listen for a search command, receive the search command broadcasted by STB2 using the network interface 21 and connection 6 (e.g., the back channel), and determine that the peer STB in the search command is a match. That is, the STB in the search command is STB1. STB1 switches to an acknowledge mode and identifies itself as the STB in the search command by providing a visual indication such as activating the LED 27 on the user interface 20 (e.g., blinking) to help the user locate and identify the STB1 as the paired device for RCU1. The following code or software 25 is executed by STB1 to listen for a search command, receive the search command, determine a match, and switch to acknowledge mode and identify:

```
My MAC = get_my_Bluetooth_MAC( )
while(True) {
   SearchCommand = wait_for_search_command_from_BLE( )
   if (MAC eq SearchCommand ->peer) {
      set_state(ACKNOWLEDGED);
      set_led(blink);
   } else {
   broadcast_to_network(SearchCommand);
   }
}.
```

The above code is executed by STB1 to continuously listen for search commands from remote control units (e.g., RCU1). If the search was issued by a remote control unit paired with STB1, then it would respond immediately. If not, the STB1 would broadcast the search to other STBs in the network.

The method and algorithm of FIG. 6 provides a quick, easy, convenient, and inexpensive search function to locate and identify which client device 3 out of several client devices 3 is paired to a remote control unit 4.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIGS. 4-6. For example, the one or more memories stores software or algorithms with executable instructions and the one or more processors can execute a set of instructions of the software or algorithms in association with onboarding of wireless extenders in the wireless residential network.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. An electronic device having a function of locating and identifying a paired device in a wireless network, the wireless network communicatively connecting a plurality of electronic devices including the electronic device and the paired device, the electronic device comprising:
   a user interface;
   a network interface configured to establish communication connections via the wireless network;
   a hardware processor; and
   a non-transitory memory configured to store one or more programs, the hardware processor being configured to execute the one or more programs to:
   receive a search command using a first communication connection via the network interface from a second electronic device in the wireless network, the search command including identifying information of the paired device as a peer device;
   determine whether the identifying information in the search command for the peer device matches identifying information of the electronic device;
   when the identifying information in the search command for the peer device matches the identifying information of the electronic device, identify as the paired device; and
   when the identifying information in the search command for the peer device does not match the identifying information of the electronic device, broadcast the search command using a second communication connection via the network interface to one or more third electronic devices in the wireless network,
   wherein the one or more third electronic devices either identify as the paired device, or broadcast the search command over the wireless network for receipt by the paired device.

2. The electronic device according to claim 1, wherein the electronic device is a first electronic device in the wireless network and includes a set-top-box (STB).

3. The electronic device according to claim 1, wherein the first communication connection is a back channel connection that operates in accordance with Wi-Fi or Ethernet protocols.

4. The electronic device according to claim 3, wherein the second electronic device includes a STB.

5. The electronic device according to claim 2, wherein the first communication connection is a short-range connection that operates in accordance with Bluetooth or Radio Frequency for Consumer Electronics (RF4CE) protocols, and
   the second electronic device includes a remote control unit.

6. The electronic device according to claim 1,
   wherein the second communication connection is a back channel connection that operates in accordance with Wi-Fi or Ethernet protocols.

7. The electronic device according to claim 6, wherein the one or more third electronic devices include a STB.

8. A method for locating and identifying a paired device in a wireless network, the wireless network communicatively connecting a plurality of electronic devices including the paired device, the method comprising:
   receiving by a first electronic device, using a first communication connection, a search command including identifying information of the paired device as a peer device from a second electronic device in the wireless network;
   determining, using the first electronic device, whether the identifying information in the search command for the peer device matches identifying information of the electronic device;
   when the identifying information in the search command for the peer device matches identifying information of the first electronic device, identifying the first electronic device as the paired device; and
   when the identifying information in the search command for the peer device does not match the identifying information of the electronic device, broadcasting from the first electronic device, using a second communication connection, the search command to one or more third electronic devices in the wireless network, wherein the one or more third electronic devices either identify as the paired device, or broadcast the search command over the wireless network for receipt by the paired device.

9. The method according to claim 8, wherein the first electronic device is a first electronic device in the wireless network and includes a set-top-box (STB).

10. The method according to claim 8, wherein the first communication connection includes a back channel connection that operates in accordance with Wi-Fi or Ethernet protocols.

11. The method according to claim 10, wherein the second electronic device includes a STB.

12. The method according to claim 8, wherein
the first communication connection includes a short-range connection that operates in accordance with Bluetooth or RF4CE protocols, and
the second electronic device includes a remote control unit.

13. The method according to claim 8,
wherein the second communication connection is a back channel connection that operates in accordance with Wi-Fi or Ethernet protocols.

14. The method according to claim 13, wherein the one or more third electronic devices include a STB.

15. A non-transitory computer-readable recording medium in a first electronic device for locating and identifying a paired device in a wireless network, the wireless network communicatively connecting a plurality of electronic devices including the first electronic device and the paired device, the non-transitory computer-readable recording medium storing one or more programs which when executed by a hardware processor performs steps comprising:

receiving by a first electronic device, using a first communication connection, a search command including identifying information of the paired device as a peer device from a second electronic device in the wireless network;

determining, using the first electronic device, whether the identifying information in the search command for the peer device matches identifying information of the electronic device;

when the identifying information in the search command for the peer device matches identifying information of the first electronic device, identifying the first electronic device as the paired device; and when the identifying information in the search command for the peer device does not match the identifying information of the electronic device, broadcasting from the first electronic device, using a second communication connection, the search command to one or more third electronic devices in the wireless network, wherein the one or more third electronic devices either identify as the paired device, or broadcast the search command over the wireless network for receipt by the paired device.

16. The non-transitory computer-readable recording medium according to claim 15, wherein the first electronic device is a first electronic device in the wireless network and includes a set-top-box (STB).

17. The non-transitory computer-readable recording medium according to claim 15, wherein the first communication connection includes a back channel connection that operates in accordance with Wi-Fi or Ethernet protocols.

18. The non-transitory computer-readable recording medium according to claim 15, wherein the second electronic device includes a STB.

19. The non-transitory computer-readable recording medium according to claim 18, wherein
the first communication connection includes a short-range connection that operates in accordance with Bluetooth or RF4CE protocols, and
the second electronic device includes a remote control unit.

20. The non-transitory computer-readable recording medium according to claim 15,
wherein the second communication connection is a back channel connection that operates in accordance with Wi-Fi or Ethernet protocols.

21. The non-transitory computer-readable recording medium according to claim 20, wherein the one or more third electronic devices include a STB.

\* \* \* \* \*